United States Patent [19]

Erwin et al.

[11] 4,241,753
[45] Dec. 30, 1980

[54] CONTROL VALVE FOR USE WITH VARIABLE DISPLACEMENT PISTON PUMP

[75] Inventors: Louis R. Erwin, Livonia, Mich.; Frank Woodruff, New Hartford, N.Y.

[73] Assignee: The Bendix Corporation, Utica, N.Y.

[21] Appl. No.: 49,258

[22] Filed: Jun. 18, 1979

Related U.S. Application Data

[63] Continuation of Ser. No. 794,774, May 9, 1977, abandoned.

[51] Int. Cl.³ ............................................. G05D 11/00
[52] U.S. Cl. ................................. 137/116.3; 251/337
[58] Field of Search ...................... 137/101, 115, 116.3, 137/116.5; 251/337; 417/218, 222; 60/422

[56] References Cited

U.S. PATENT DOCUMENTS

| | | | |
|---|---|---|---|
| 3,712,333 | 1/1973 | Semon | 137/116.5 |
| 3,877,839 | 4/1975 | Ifield | 417/222 X |
| 3,926,208 | 12/1975 | Hoffman | 137/116.5 X |
| 3,979,907 | 9/1976 | Paul | 137/101 X |
| 3,996,742 | 12/1976 | Goff | 137/101 |
| 4,102,607 | 7/1978 | Benson | 417/222 |

*Primary Examiner*—William R. Cline
*Attorney, Agent, or Firm*—Anthony F. Cuoco

[57] ABSTRACT

For use with a variable displacement piston type pump, a valve responsive to pump discharge manifold pressure for controlling the pressure in the pump chamber, and which controlled pressure creates a force for regulating the stroke of the pump pistons to maintain a predetermined substantially constant pressure with a variable flow of fluid through the pump.

8 Claims, 2 Drawing Figures

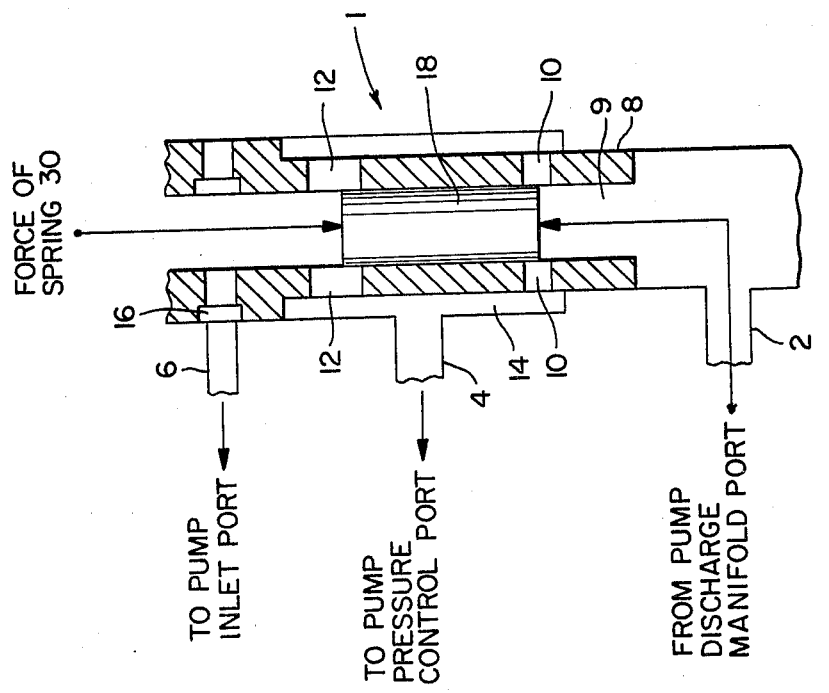
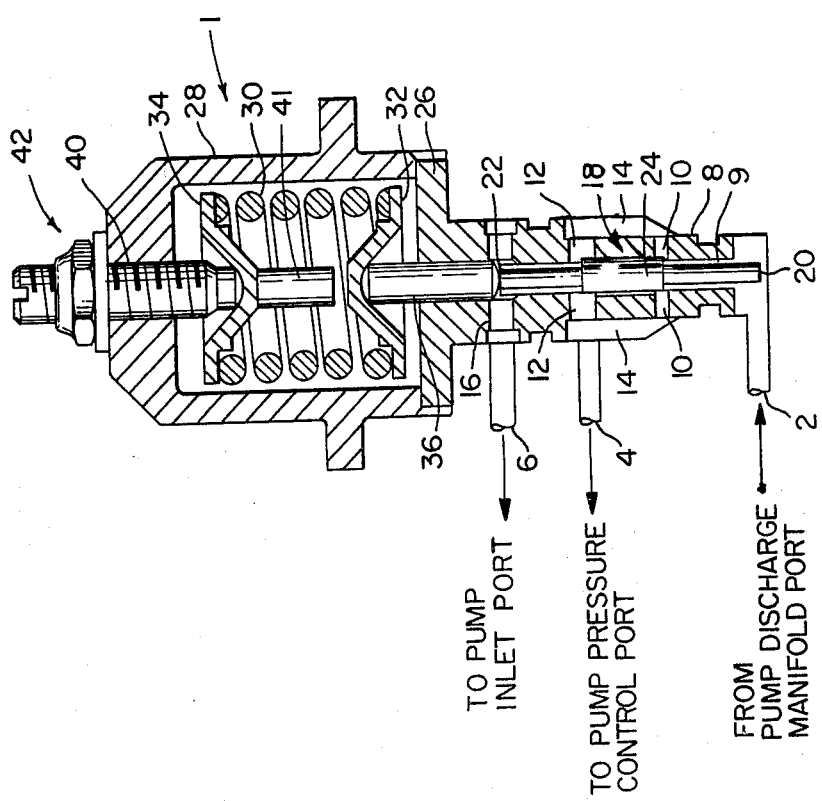

CONTROL VALVE FOR USE WITH VARIABLE DISPLACEMENT PISTON PUMP

BACKGROUND OF THE INVENTION

Cross Reference to Related Applications

This is a continuation of application Ser. No. 794,774, filed May 9, 1977, now abandoned.

The valve disclosed herein may be used in conjunction with a variable displacement piston pump such as described and claimed in commonly assigned copending U.S. application Ser. No. 796,933, filed by Frank Woodruff on May 16, 1977, and now U.S. Pat. No. 4,149,830 issued on Apr. 17, 1979.

Field of the Invention

This invention relates generally to pump pressure control valves and, particularly, to a valve which controls the discharge manifold pressure of the pump to provide a pressure for regulating the stroke of the pump pistons.

Description of the Prior Art

The aforenoted U.S. Pat. No. 4,149,830 describes a variable displacement piston pump including a shaft having a driven end and an opposite end arranged for supporting a swash plate to pivot about an axis displaced from the center line of the shaft and preferably, but not necessarily, normal thereto. A plurality of pistons having hollow cylinders extending therethrough are arranged with corresponding check valves in a pump block. During the "delivery" stroke of the pistons the pressure in the cylinders becomes sufficient to actuate the check valves whereby fluid is delivered to a common discharge manifold.

When the manifold pressure approaches a predetermined value, a force is created which is transmitted to the swash plate and pivots the plate away from a maximum flow position. The pistons are arranged with the swash plate so that when the swash plate pivots, the stroke of the pistons is decreased to reduce fluid flow and pressure. Equilibrium is thus established and a reduced fluid flow at a predetermined substantially constant pressure is maintained. The valve of the present invention is used in conjunction with a pump of the type described to control the pump manifold pressure for providing a pressure which creates the force transmitted to the swash plate. The valve herein described features a novel arrangement including an elongated spool section responsive to pump discharge manifold pressure for varying the area of a pair of orifices arranged in series relation to provide a pressure which is transmitted to the pump chamber for regulating the stroke of the pump pistons.

SUMMARY OF THE INVENTION

This invention contemplates a pump pressure control valve of the type described including a spool responsive to pump discharge manifold pressure for being displaced against a spring force. The spool includes an elongated section which varies the area of a pair of orifices arranged in series relation and used for inlet and exhaust of a control pressure generated by the valve. The orifice are of different diameters to permit tailoring of the control pressure in relation to spool stroke for obtaining reasonably balanced slew rates toward or away from full pump flow. Means are provided for accommodating less than perfect spring force alignment along the spool axis.

One object of this invention is to provide a pressure control valve for a variable displacement piston type pump, whereby the pump is supplied with a pressure which creates a force for regulating the stroke of the pump pistons to provide a variable fluid flow at a substantially constant pressure.

Another object of this invention is to provide a valve of the type described which includes an elongated spool section responsive to pump discharge manifold pressure for varying the area of control pressure inlet and outlet orifices.

Another object of this invention is to provide the orifices of different diameters, with the area of the orifices being varied by the elongated spool section, whereby the control pressure in relation to the spool stroke can be tailored for reasonably balanced slew rates toward and away from full pump flow.

Another object of this invention is to actuate the valve spool against a spring force and to accommodate misalignment of the spring force along the spool axis.

The foregoing and other objects and advantages of the invention will appear more fully hereinafter from a consideration of the detailed description which follows taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a partially sectioned front plan view showing in substantial detail a pump pressure control valve according to the invention.

FIG. 2 is a schematic diagram illustrating the operation of the valve shown in detail in FIG. 1.

DESCRIPTION OF THE INVENTION

With reference first to FIG. 1, a pump pressure control valve designated by the numeral 1 includes an inlet port 2, an outlet port 4 and an outlet port 6. Inlet port 2 is connected to a pump discharge manifold port whereby the pump discharge manifold pressure is transmitted to valve 1. Outlet port 4 is connected to a pump pressure control port whereby a control pressure is transmitted to the pump for creating a force for regulating the stroke of the pump's pistons. The operation of the pump in this regard is described in the aforenoted U.S. Pat. No. 4,149,830. Outlet port 6 of valve 1 is connected to a pump inlet port for purposes to be hereinafter described.

Valve 1 includes a cylinder 8 having a bore 9 extending therethrough, and having control pressure inlet orifices 10 and control pressure outlet orifices 12 which are in communication with a channel 14. Channel 14 is in turn in communication with valve outlet port 4. Valve 1 further includes an orifice 16 which is in communication with valve outlet port 6. In this connection it is noted that orifices 10 and 12 are provided on both sides of cylinder 8 to preclude a side load on the spool. As a design matter, more than one pair of orifices may be used as may be desired.

A valve spool 18 is axially disposed within bore 9 and includes end sections 20 and 22 of a predetermined diameter and an elongated section 24 intermediate end sections 20 and 22. Section 24 is of a substantially larger diameter than sections 20 and 22. Section 24 is arranged with orifices 10 and 12 so as to vary the area of the orifices and to thereby provide a control pressure at valve outlet port 4 as will be hereinafter described.

Cylinder 8 terminates in an enlarged section 26 which is held in place by a valve housing 28. A spring 30 is disposed within valve housing 28 intermediate a spring follower 32 disposed near section 26 and an oppositely disposed spring follower 34. Spring follower 34 includes an axially extending portion 35 having a purpose which will be hereinafter described.

A free floating pin designated by the numeral 36 is disposed within bore 9 adjacent the end of spool section 22 and intermediate said end and spring follower 32. Pin 36 is designed to have sufficient strength and surface area to carry any sideload resulting from less than perfect alignment of the force of spring 30 along the common axis of pin 36 and spool 18. Bore 9 may or may not be enlarged in the area containing pin 36, as dictated by the proper design of the pin. As a design matter, diametral clearance between pin 36 and bore 9 need not be closely held, since the clearance does not affect fluid leakage, and only nominal concentricity relative to spool 18 is required.

A rod 40 extends through valve housing 38 and is adjustable through a thread and nut arrangement 42 for displacing spring follower 34 to adjust the tension on spring 30. Axially extending portion 35 of spring follower 34 which is arranged for sufficient clearance with spring follower 32 so that compression of spring 30 beyond spool stroke requirements is precluded. This is an optical design feature to protect the spring from over-stress and possible permanent deformation.

OPERATION OF THE INVENTION

With the specific structural details of valve 1 illustrated and described with reference to FIG. 1, the operation of the valve will next be described with reference to the schematic diagram of FIG. 2.

Thus, the pump discharge manifold pressure received by valve 1 through port 2, and which pressure may be for purposes of illustration 6,000 psi, forces spool 18 in bore 9 upward against the downward force extended by spring 30, relative to the illustration of FIG. 2. This increases the area of orifices 10 which may have a diameter of 0.040 inches and decreases the area of orifices 12 which may have a diameter of 0.090 inches. Orifices 10 and 12, of different diameters and in the series arrangement as shown, create an intermediate control pressure in channel 14, which may be 500 psi, for transmission to the pump pressure control port via valve outlet port 4. With the arrangement shown, the pressure at valve outlet port 6 which is transmitted to the pump inlet port is substantially zero. The pressure at port 4 actuates a mechanism and causes the pump to de-stroke as described in the aforenoted U.S. Pat. No. 4,149,830.

With further reference to FIG. 1, it will be seen that fluid leakage to vent must either go through the control pressure route or along elongated section 24 of spool 18. The relatively long enlarged diameter of spool section 24 facilitates the use of separate orifices 10 and 12 which, in turn, facilitate obtaining desired rates of change in the area of the orifices in relation to the stroke of spool 18. Elongated spool section 24 also permits a desired low fluid leakage with a practical diametral clearance with bore 8, the same being advantageous from a manufacturing standpoint.

The ratio of the diameters of orifices 10 and 12, orifices 10 being of the smaller diameter and orifices 12 being of the larger diameter, provides considerable flexibility in tailoring the control pressure in relation to the stroke of spool 18 to obtain both reasonably balanced slew rates toward or away from full pump flow and desired rates of change of the areas of the orifices. This results in a desired change of control pressure in relation to spool stroke.

It is understood that the recited pressures and orifice diameters are for illustration purposes only and may be varied depending upon the size of the pump, the amount of fluid to be pumped, and the several other parameters which may be taken into account, the same being a matter of design.

It will be seen from the aforegoing description of the invention that a fuel pump pressure control valve has been described which controls the pressure from the pump discharge manifold to provide a pressure for regulating the stroke of the pump pistons. The valve as described minimizes fluid leakage without extremely severe diameter tolerances and minimizes spring side loading. The spool diameter is chosen to:

a. provide sufficient force for an allowed change in pump discharge pressure to obtain a practical spool stroke with a spring rate-to-inertia ratio which puts the spring-mass resonance above the pump piston frequency for maximum pump speed;

b. minimize leakage by using minimum spool diameters; and c. allow sufficient area around spool portion 22 so as not to restrict flow through orifice 12.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A pressure control valve for a pump having a relatively high discharge pressure, comprising:

a valve cylinder having a bore extending at least partially therethrough;

a pressure inlet port extending external to the valve and communicating with the valve cylinder bore and the pump whereby the relatively high pump discharge pressure is transmitted to the valve;

a spring loaded valve spool disposed within the valve cylinder bore and responsive to the relatively high pump discharge pressure transmitted to the valve for being displaced against the spring load;

first and second orifices disposed substantially apart from communicating with separate portions of the valve cylinder bore, the first orifice communicating with the portion of the valve cylinder bore communicating with the pressure inlet port and said first and second orifices disposed relative to the valve spool so that the displacement of the valve spool increases the area of one of the orifices and decreases the area of the other of the orifices;

a channel in communication with the first and second orifices, with a relatively intermediate control pressure being created in the channel and a relatively low pressure being created in the portion of the valve cylinder bore communicating with the other orifice upon the area of the one orifice increasing and the area of the other orifice decreasing;

a first pressure outlet port extending external to the valve and communicating with the channel and the pump whereby the relatively intermediate control pressure is transmitted to the pump; and a second pressure outlet port extending external to the valve and communicating with the portion of the valve cylinder bore communicating with the other orifice and communicating with the pump, whereby the relatively low pressure is transmitted to the pump.

2. A valve as described by claim 1, including:

a first spring follower;

a second spring follower in spaced relation to the first spring follower and near the valve spool;

a spring disposed in the space between the first and second spring followers, and loaded to provide a force; and means disposed intermediate the second spring follower and the valve spool for applying the force to the valve spool.

3. A valve as described by claim 2, wherein the means disposed intermediate the second spring follower and the valve spool for applying the force to the valve spool includes:

a free floating pin member for carrying sideload resulting from misalignment of the force provided by the loaded spring and the axis of the spool.

4. A valve as described by claim 2, including:

means arranged with the first spring follower for displacing said follower to adjust the loading on the spring.

5. A valve as described by claim 4, wherein:

the first spring follower includes a member extending therefrom toward the second spring follower and having a predetermined clearance therewith for limiting the displacement of the first spring follower.

6. A valve as described by claim 1, wherein:

the first orifice is a control pressure inlet orifice and is of a predetermined diameter; and the second orifice is a control pressure outlet orifice and is of a substantially larger predetermined diameter than the diameter of the first orifice.

7. A valve as described by claim 6, wherein:

the valve spool has opposite end sections of one predetermined diameter, and a section intermediate the end sections and of a substantially larger predetermined diameter; and the first orifice of the predetermined diameter and the second orifice of the substantially larger predetermined diameter are disposed with the intermediate section of the spool of the substantially larger predetermined diameter than the end sections so that upon the displacement of the valve spool the intermediate section thereof is displaced for increasing the area of the first orifice and decreasing the area of the second orifice.

8. A valve as described by claim 1, wherein:

the first and second orifices communicate with the valve cylinder bore on one side thereof; and corresponding orifices communicate with the valve cylinder bore on the opposite side thereof to minimize side loading on the spool.

* * * * *